US010873205B2

(12) United States Patent
Cano et al.

(10) Patent No.: US 10,873,205 B2
(45) Date of Patent: Dec. 22, 2020

(54) DETACHABLE SURFACE MOUNTING UTILITY HUB

(71) Applicant: Soutono LLC, Los Angeles, CA (US)

(72) Inventors: Jose Enrique Pacheco Cano, Los Angeles, CA (US); John Sundermeyer, Los Angeles, CA (US); Ingvald Smith-Kielland, Studio City, CA (US); Ju Chia Lee, Pasadena, CA (US)

(73) Assignee: SOUTONO LLC, Los Angeles, CA (US)

( * ) Notice: Subject to any disclaimer, the term of this patent is extended or adjusted under 35 U.S.C. 154(b) by 255 days.

(21) Appl. No.: 15/687,208

(22) Filed: Aug. 25, 2017

(65) Prior Publication Data

US 2019/0067982 A1 Feb. 28, 2019

(51) Int. Cl.
  *H02J 7/35* (2006.01)
  *H02J 7/34* (2006.01)
  *H02J 50/10* (2016.01)
  *H02J 7/00* (2006.01)

(52) U.S. Cl.
  CPC .............. *H02J 7/35* (2013.01); *H02J 7/342* (2020.01); *H02J 7/00* (2013.01); *H02J 7/0042* (2013.01); *H02J 7/0044* (2013.01); *H02J 50/10* (2016.02)

(58) Field of Classification Search
  CPC ........ H02J 7/355; H02J 7/0042; H02J 7/0054; H02J 7/0045
  USPC ........................................ 320/107, 114, 103
  See application file for complete search history.

(56) References Cited

U.S. PATENT DOCUMENTS

| 3,794,054 | A | * | 2/1974 | Watts | ...................... | E04H 15/28 |
| | | | | | | 135/98 |
| 4,265,259 | A | * | 5/1981 | Gillis | ................... | E04H 15/425 |
| | | | | | | 135/115 |
| 4,811,751 | A | * | 3/1989 | Maloney, II | ............ | E04H 15/40 |
| | | | | | | 135/125 |
| 5,425,400 | A | * | 6/1995 | Szatmary | ................... | B01L 1/02 |
| | | | | | | 141/346 |
| 9,088,181 | B2 | * | 7/2015 | Akin | ...................... | A45B 23/00 |
| 2006/0207637 | A1 | * | 9/2006 | Coleiro | .................... | A45B 3/04 |
| | | | | | | 135/18 |
| 2006/0225781 | A1 | * | 10/2006 | Locher | .................... | H01L 31/02 |
| | | | | | | 136/245 |
| 2007/0180982 | A1 | * | 8/2007 | Dagher | ................... | F41H 5/013 |
| | | | | | | 89/36.02 |

(Continued)

*Primary Examiner* — David V Henze-Gongola
*Assistant Examiner* — Tarikh Kanem Rankine
(74) *Attorney, Agent, or Firm* — Ansari Katiraei LLP; Arman Katiraei; Sadiq Ansari

(57) ABSTRACT

Disclosed is a hub for charging and other applications when camping or away from power infrastructure. The hub mounts on an elevated surface such as a structure wall or roof to remain out of the way but still accessible. The hub has a body and an attachment ring. The body has a cylindrical column of a first diameter and a base of a greater second diameter. The cylindrical column has an input port along top and exterior threading below the input port. The elongated base has an output port along a bottom. The input port connects to a power source, such as a solar panel, and feeds current to the output port. The cylindrical column passes through an opening of a structure and the attachment ring screws onto the threading exposed on the other side of the structure, thereby attached the hub to the structure.

18 Claims, 10 Drawing Sheets

(56) References Cited

U.S. PATENT DOCUMENTS

| | | | | |
|---|---|---|---|---|
| 2009/0140689 A1* | 6/2009 | Lee | H02J 7/355 | 320/101 |
| 2009/0267562 A1* | 10/2009 | Guccione | H02J 7/0027 | 320/114 |
| 2010/0064945 A1* | 3/2010 | Sierenberg | A47B 37/04 | 108/50.02 |
| 2011/0155196 A1* | 6/2011 | Wu | E04H 15/02 | 135/96 |
| 2012/0281392 A1* | 11/2012 | Workman | H02J 7/35 | 362/183 |
| 2013/0267116 A1* | 10/2013 | Tin | H02J 1/00 | 439/535 |
| 2014/0009103 A1* | 1/2014 | Nita | H02J 7/355 | 320/101 |
| 2014/0084860 A1* | 3/2014 | Jaax | A61N 1/3787 | 320/108 |
| 2014/0111948 A1* | 4/2014 | Ma | H05K 5/0073 | 361/729 |
| 2015/0194839 A1* | 7/2015 | Wojcik | H01M 10/46 | 320/108 |
| 2015/0237217 A1* | 8/2015 | Roark | A45C 15/00 | 455/556.1 |
| 2015/0244182 A1* | 8/2015 | Ozana | H02J 5/005 | 307/104 |
| 2015/0263553 A1* | 9/2015 | Fuller | H02J 7/0044 | 320/114 |
| 2015/0326044 A1* | 11/2015 | Ashley | H02J 7/0054 | 320/103 |
| 2015/0340892 A1* | 11/2015 | Schreiner | H02J 7/0044 | 320/137 |
| 2017/0279295 A1* | 9/2017 | Wojcik | H01M 10/46 | |
| 2017/0317533 A1* | 11/2017 | Byrne | H02J 50/12 | |
| 2017/0324372 A1* | 11/2017 | Gharabegian | H04W 4/90 | |
| 2018/0006471 A1* | 1/2018 | Hayes | H02M 1/00 | |
| 2018/0131201 A1* | 5/2018 | Calhoun | H04W 4/38 | |
| 2018/0205253 A1* | 7/2018 | Kwak | H02J 7/0055 | |

* cited by examiner

DETACHABLE SURFACE MOUNTING UTILITY HUB

BACKGROUND ART

Electricity drives most of the tools and applications we use in our daily lives. We depend on electricity for communication, lighting, work, entertainment, and other applications.

Even though many of the devices and applications have batteries that allow the devices to go wherever we go or to use the applications wherever we go, without a replenishing power source, these devices and applications eventually become unusable. Some devices or applications allow for the swapping of depleted batteries with fresh batteries. However, it is inconvenient and expensive to carry a large number of batteries when camping, traveling long distances, traveling to remote locations, or outdoors for extended periods of time.

Renewable energy sources can power devices or recharge depleted batteries. Portable solar panels are one such renewable energy source that can be carried on backpacks or on one's person. However, portable solar panels lack the surface area to produce sufficient electricity for more than one device and provide slow charging. Solar panels also have to be used outside where they can be exposed to light, which can be inconvenient or inaccessible when wanting to use or recharge devices or applications inside a structure.

There is therefore a need for better access to solar generated electricity when outdoors or away from established infrastructure. More specifically, there is a need for convenient setup and access so that the electricity generated from larger solar arrays placed outside a structure can be used to power or recharge devices and applications inside the structure without running long wiring or cabling.

BRIEF DESCRIPTION OF THE DRAWINGS

A preferred embodiment for a detachable surface mounting utility hub will now be described, by way of example only, with reference to the accompanying drawings in which.

DETAILED DESCRIPTION

A detachable surface mounting utility hub is disclosed. The utility hub mounts on the interior or inside of walls or roof of a structure and connects to a power source such as a solar panel that is mounted on the exterior or outside of the structure. The utility hub distributes power from the power source to various devices or applications inside the structure in a convenient and easy to access manner that involves minimal setup. the utility hub occupies minimal space within the structure and remains out of the way while still being easy to access by virtue of mounting to the structure's interior walls or roof. Accordingly, the utility hub is ideal for outdoor and tenting usage.

Figure 1:
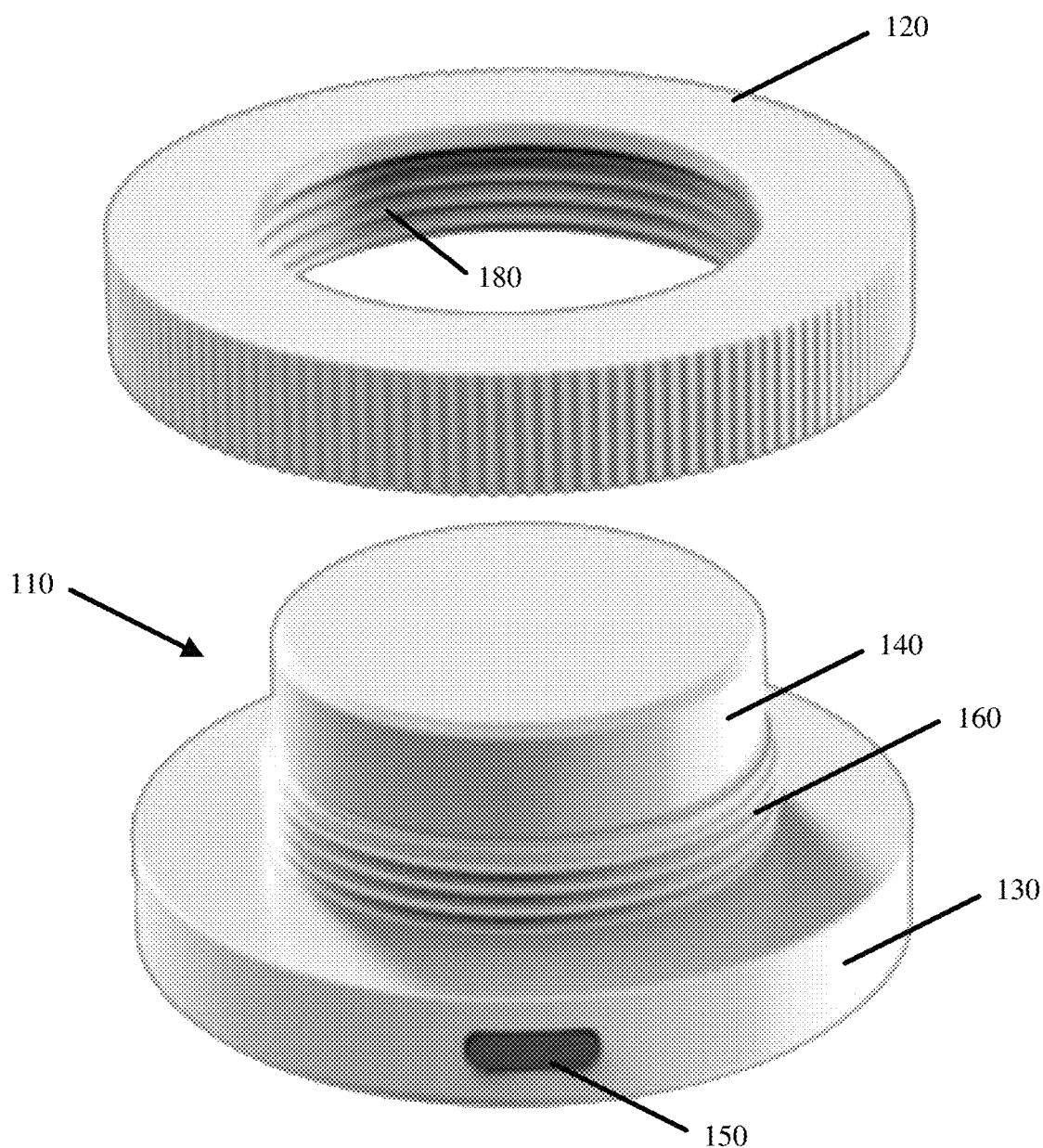
FIG. 1 illustrates a separated view of the utility hub of some embodiments.

FIG. 1 illustrates a separated view of the utility hub of some embodiments. The utility hub has two primary structures. The first structure is a power distribution body 110. The second structure is an attachment ring 120.

Figure 2:
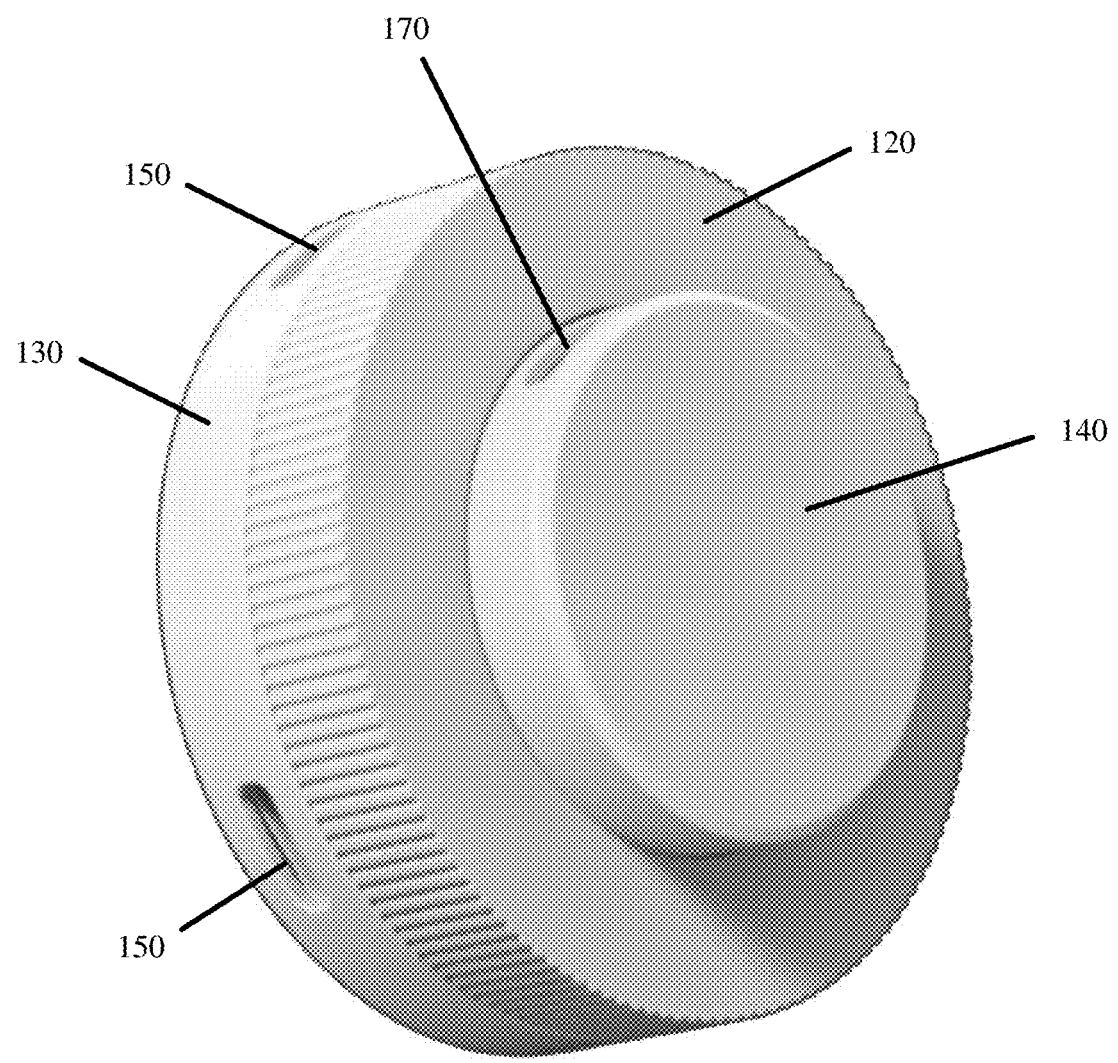
FIG. 2 illustrates a side perspective view of the utility hub with the attachment ring coupled to the power distribution body.
Figure 3:
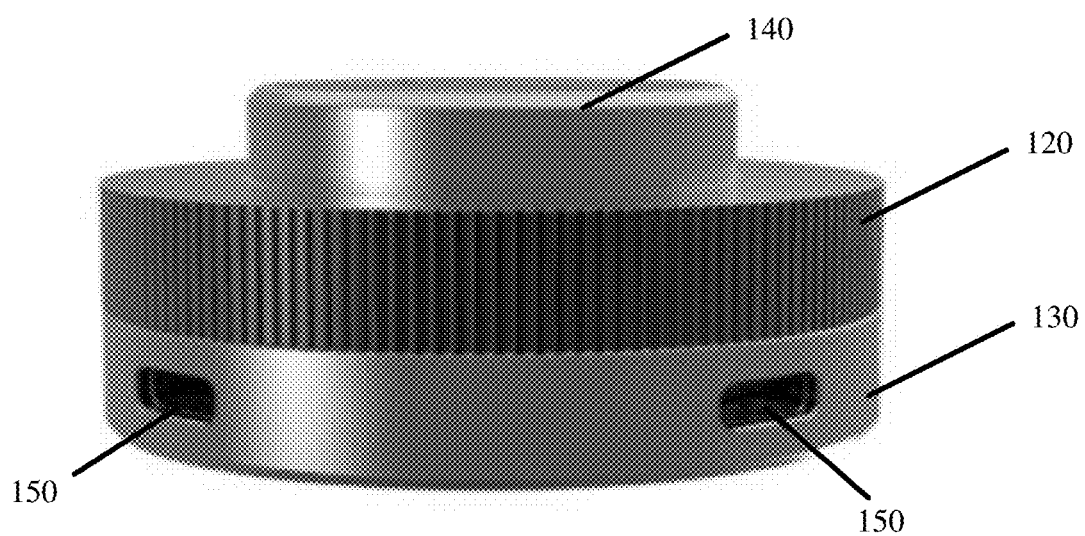
FIG. 3 illustrates a front view of the utility hub with the attachment ring coupled to the power distribution body.

FIGS. 2 and 3 illustrate a coupled view of the utility hub of some embodiments. In particular, FIG. 2 illustrates a side perspective view of the utility hub with the attachment ring 120 coupled to the power distribution body 110, and FIG. 3 illustrates a front view of the utility hub with the attachment ring 120 coupled to the power distribution body 110.

The power distribution body 110 is a unitary structure with a base 130 and a protuberance 140 extending upwards centrally from the base 130. The power distribution body 110 distributes power from a power source, such as a solar panel, outside of a structure to devices in the interior of the structure. The power distribution body 110 is intended for use with tents, but can be adapted for other structures including boxes, bags, cases, vessels, and shelters as some examples.

The base 130 has a first diameter that is greater than a second diameter of the protuberance 140. The base 130 stays within the interior or inside of the structure to which the utility hub is mounted. The base 130 provides one or more interior connection interfaces 150.

The interior connection interfaces 150 provide one or more of the same or different ports for connecting to different devices. The interior connection interfaces 150 output power to the connected devices. The interfaces 150 may output the same or different amounts of power. In some embodiments, the output power is dynamically adjusted based on circuitry that detects a connected device. The interior connection interfaces 150 can include one or more Universal Serial Bus (USB) type A, B, or C ports, micro USB ports, mini USB ports, Thunderbolt ports, two or three prong outlets, and other connection or charging ports. In some embodiments, the power distribution body base 130 can be elongated to make room for multiple rows of interior connection interfaces 150. The interfaces 150 in the different rows can be offset for easier access.

The protuberance 140 extends centrally from the base 130 upwards by several inches. The protuberance 140 is an upward extending segment in the form of a cylindrical column. The protuberance 140 has exterior threading 160 and an exterior connection interface 170 above the exterior threading 160 near the top of the protuberance 140.

The exterior connection interface 170 can be a USB port or other port through which power can be transferred. The exterior connection interface 170 is an input power port for receiving power from a power source such as a solar panel. The exterior connection interface 170 distributes or diverts the power through the one or more interior connection interfaces 150 to any devices that are connected to the interfaces 150. Internal wiring and circuitry connects the exterior connection interface 170 to the one or more interior connection interfaces 150.

Since the exterior connection interface 170 is exposed to outside elements, some embodiments weatherproof the exterior connection interface 170. Gaskets around the exterior connection interface 170 or a moveable flap can be used to protect the exterior connection interface 170.

The attachment ring 120 has exterior grooves for improved grip. The attachment ring 120 also has a central threaded opening. The size of the opening is about equal to the second diameter of the protuberance 140. Inner threading 180 is provided along the sides of the opening. The inner threading 180 screws the attachment ring 120 onto the exterior threading 160 of the protuberance 140. The attachment ring 120 screws down below the exterior connection interface 170 of the protuberance 140, thereby exposing the exterior connection interface 170 for connection to a power source or solar panel. As demonstrated in FIG. 4 below, screwing the attachment ring 120 to the protuberance 140 couples the utility hub to a surface of a structure that is disposed between the attachment ring 120 and the base 130 with the protuberance 140 passing through an opening in the structure.

Figure 4:
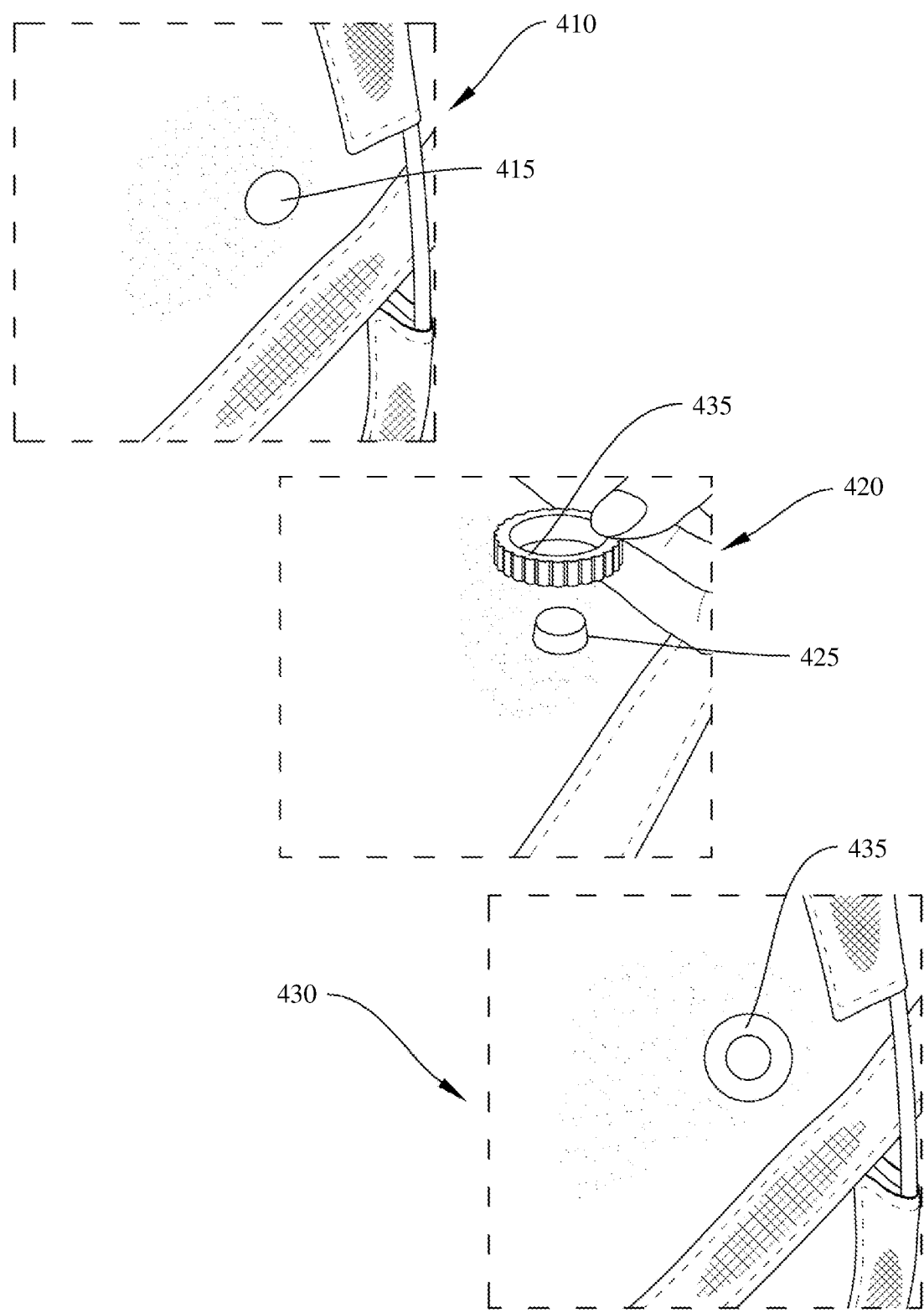
FIG. 4 illustrates mounting the utility hub to a wall or roof of a tent structure. The tent has an opening about a wall or roof that is equal in diameter to the second diameter of the utility hub protuberance.

FIG. 4 illustrates mounting the utility hub to a wall or roof of a tent structure. As shown at 410, the tent has an opening 415 about a surface along a wall or roof of the tent. The opening 415 is equal in diameter to the second diameter of the utility hub protuberance. As shown at 420, the power distribution body protuberance 425 (including the exterior connection interface at the top of the protuberance 425) passes through the opening from within the tent structure and becomes exposed outside the structure. The base of the power distribution body cannot pass through the opening because of its wider base. As shown at 430, the attachment ring 435 is then screwed onto the threads of the protuberance jutting out from the exterior of the tent structure. The tent structure becomes disposed between the attachment ring 435 and the power distribution body base. The utility hub is now secured and mounted to the surface of the tent.

The compression of the attachment ring and the power distribution body base about either side of the tent surface creates a waterproof seal preventing liquids from seeping through the opening through which the protuberance is passed through. In some embodiments, a rubber or plastic washer is placed through the protuberance and atop the exterior of the structure surface to improve the seal. A complimentary washer can be placed on the structure surface interior to further improve the seal. The complimentary washer passes through the protuberance before the protuberance is passed through the structure such that the complimentary washer is disposed between the power distribution body base and the interior of the structure surface. In some embodiments, the washer is incorporated or otherwise embedded into the surface of the structure.

Figure 5:
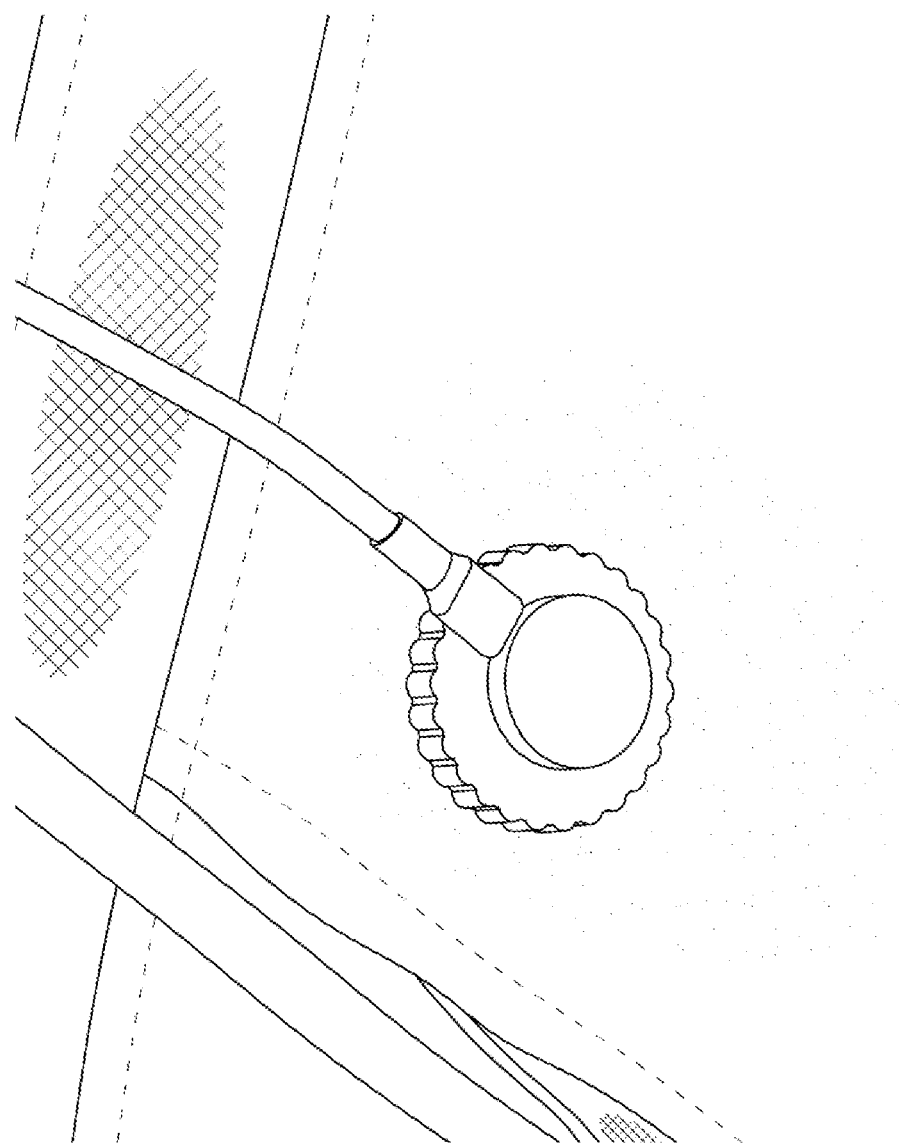
FIG. 5 illustrates connecting a power wire from a power source to the exterior connection interface of the utility hub jutting up and out from the exterior of the tent structure.
Figure 6:
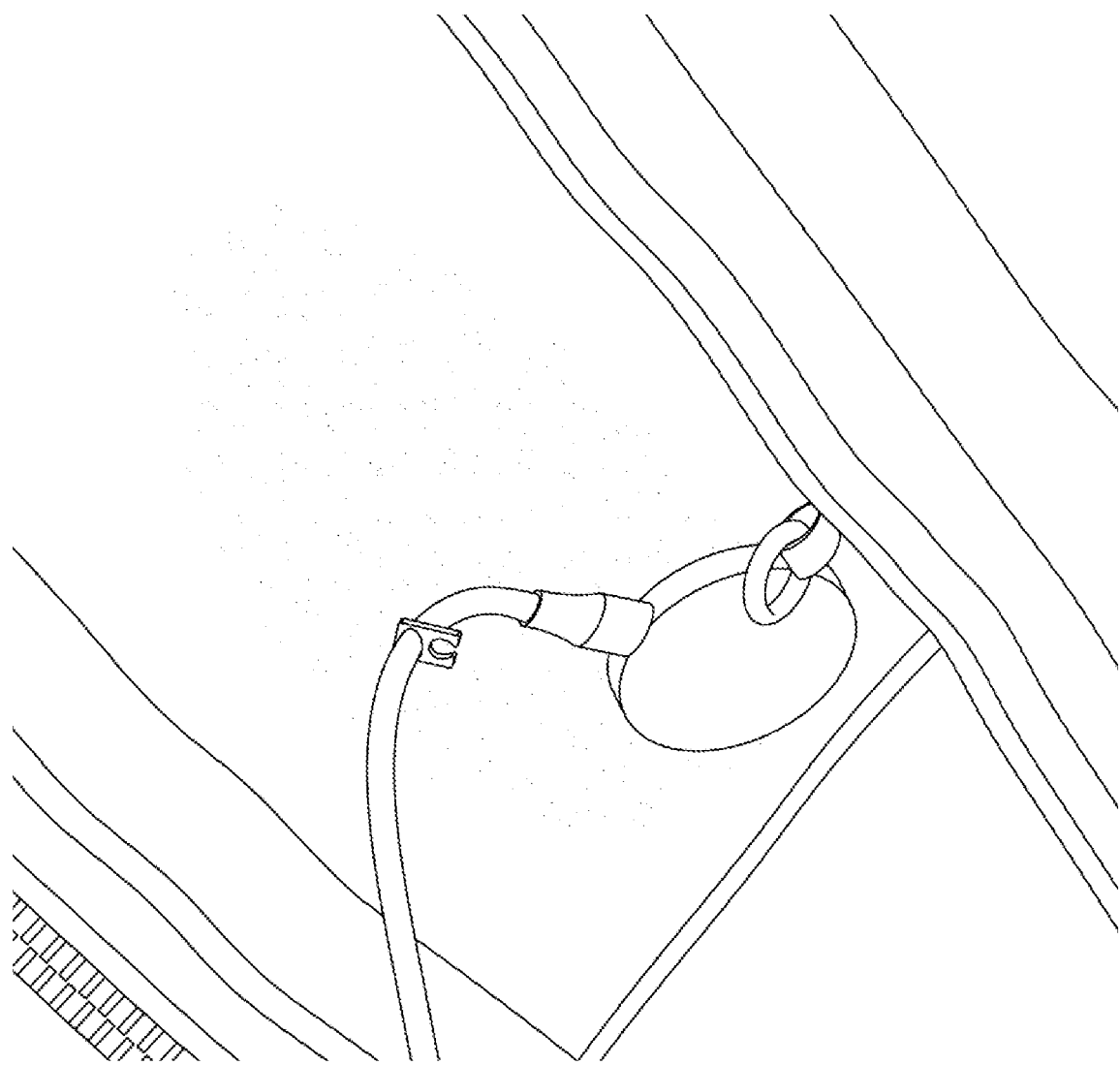
FIG. 6 illustrates connecting a device from within the tent structure to one of the interior connection interfaces of the utility hub.

FIG. 5 illustrates connecting a power wire from a power source to the exterior connection interface of the utility hub jutting up and out from the exterior of the tent structure. FIG. 6 illustrates connecting a device from within the tent structure to one of the interior connection interfaces of the utility hub. Once the connections illustrated in FIGS. 5 and 6 are made, power flows from the power source through the exterior connection interface and out of the interior connection interface of the utility hub to the connected device.

Convenient access to the solar panel power is provided as the interior connection interfaces of the utility hub are within arms-length from inside the structure without the need to run any wiring to the outside of the structure. The utility hub stays out of the way based on its suspension from the structure wall or roof as opposed to being on the floor or in a walking path of the structure.

In some embodiments, the utility hub has a different form than the circular puck form illustrated by the figures above. In some such embodiments, the utility hub has an exterior square shaped structure. Some embodiments alter the means with which to couple the attachment ring to the power distribution body. The screw based coupling mechanism can be substituted with magnetic coupling, wherein the attachment ring has a magnet with a first polarity and the power distribution body has a magnetic with opposite second polarity that is attracted to and couples with the first polarity of the attachment ring when placed adjacent to one another.

In some embodiments, the utility hub functionality and application is enhanced with an internal battery. A solar panel connected to the exterior connection interface supplies power that charges the internal battery and any connected devices during daytime when the solar panel receives and converts light to electricity. The internal battery can then supply the stored power to charge connected devices at nighttime when no power is supplied by the solar panel. This functionality is desirable when the devices are in use during the daytime and need recharging at night.

Figure 7:
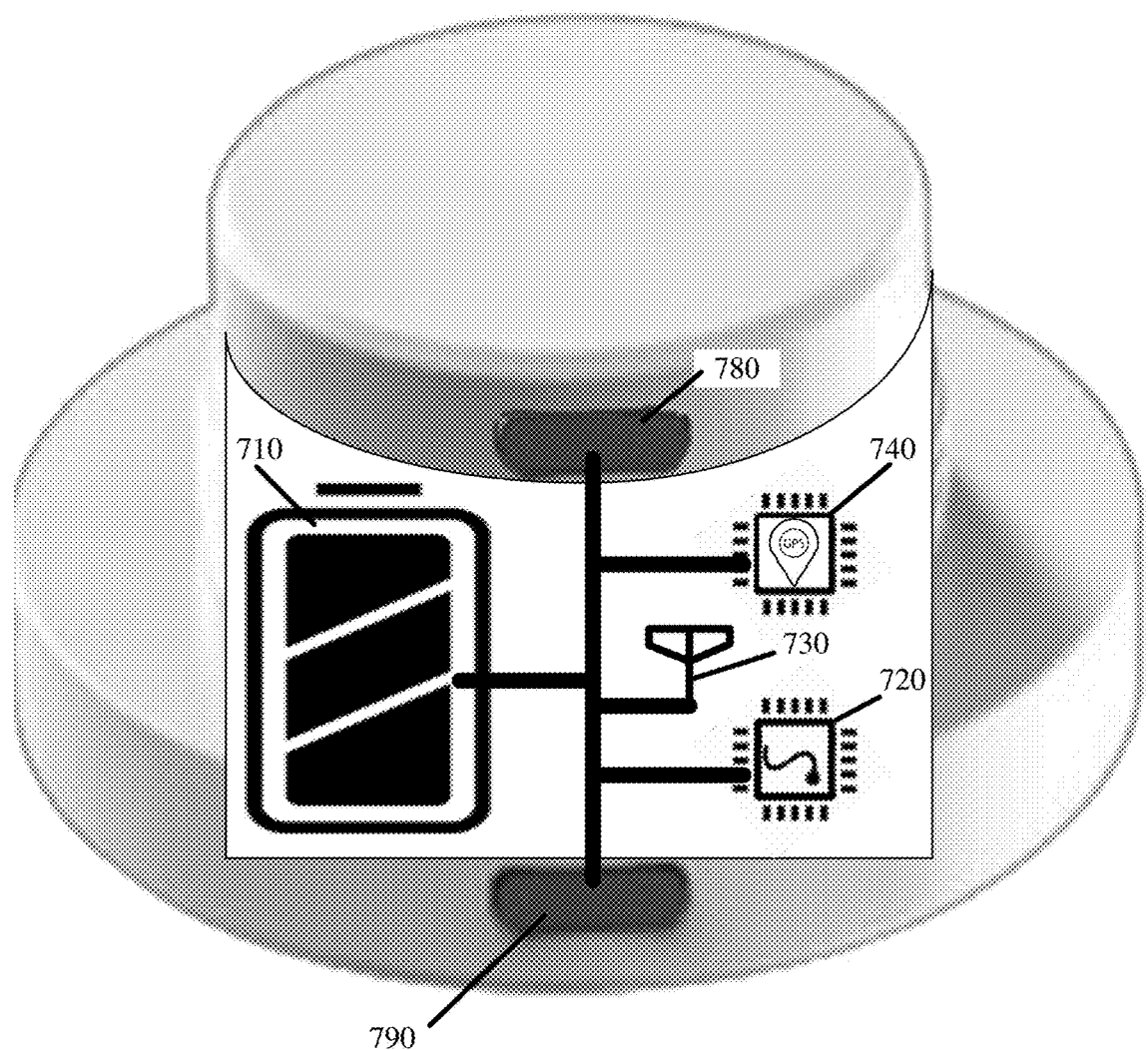
FIG. 7 provides cutaway perspective side and bottom views of the utility hub to conceptually illustrate optional components providing the enhanced functionality and applications in accordance with some embodiments.
Figure 7:
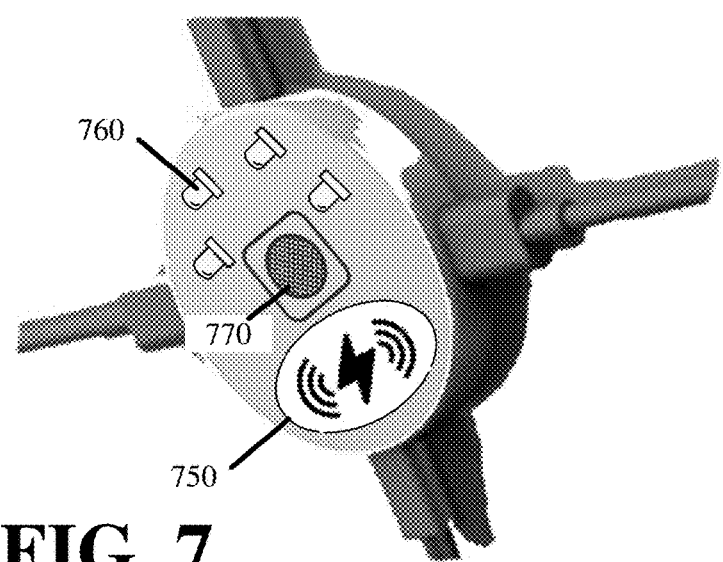

FIG. 7 provides cutaway perspective side and bottom views of the utility hub to conceptually illustrate the components providing the enhanced functionality and applications in accordance with some embodiments. More specifically, the cutaway perspective side view conceptually illustrates the internal components including one or more of an integrated battery 710, power control circuitry 720, a wireless receiver 730, and a global positioning system (GPS) module 740. The perspective bottom view illustrates the components exposed from a bottom of the utility hub including one or more of an induction coil 750, lights 760, and a speaker 770. Different embodiments of the utility hub may include zero or more of these optional components.

In FIG. 7, the battery 710 is stacked and cylindrical to fit within the protuberance. An alternative circular puck shaped battery can be placed in the power distribution body base. The integrated battery 710 is charged by power received through the exterior connection interface 780 whether from a solar panel or other power source. The integrated battery 710 is connected via wiring to the one or more interior connection interfaces 790 and provides power to devices connected to these interfaces 790. The integrated battery 710 also provides powers to each of the other components 730-770 when present and active on the utility hub.

The power control circuitry 720 controls power output to the components 730-770 or the one or more interior connection interfaces 790. The power control circuitry 720 can detect activation of one or more of the components 730-770 and control the integrated battery 710 to supply power to the activated component. The power control circuitry 720 can also detect devices that connect through the one or more interior connection interfaces 790 and adjust the amount of power supplied to the interface 790 based on the detected device. For instance, the power control circuitry 720 can supply 2 amperes at 5 volts to a first device detected to support Quick Charge 1.0, supply 2 amperes at 5, 9, or 12 volts to a second device detected to support Quick Charge 2.0, and supply 2.5 or 4.6 amperes at up to 20 volts to a third device detected to support Quick Charge 3.0 through the same or different interior connection interfaces 790. The power control circuitry 720 can also supply the available power from the integrated battery 710 equally or differently across the interior connection interfaces 790 when two or more devices are connected to the interfaces 790.

The wireless receiver 730 receives wireless messages from a network enabled device such as a smartphone. The wireless receiver 730 can support Bluetooth or Bluetooth Low Energy signaling. Alternatively, the wireless receiver 730 can support WiFi (i.e., 802.11 wireless standard) signaling. The wireless receiver 730 can receive commands that control the power output to the various interior connection interfaces 790 including commands that turn on and off the supply of power. The wireless receiver 730 can also receive commands that turn on and off the lighting 760 as well as audio to output from the speaker 770.

The GPS module 740 identifies the location of the utility hub. In dark or unfamiliar areas, a user can use the GPS module 740 location information to find his/her way back to camp.

The induction coil 750 enables wireless charging. The induction coil 750 produces an electromagnetic field that can wirelessly transfer power from the battery 710 to a nearby device with a complimentary induction coil. For example, the utility hub may be attached near an interior pocket of a tent that is within the electromagnetic field produced by the induction coil 750. The device can be placed in the pocket and wirelessly draw power from the utility hub without any direct connectivity to the utility hub. Wireless charging can be used when the charging cable for a device is lost or missing or when the interior connection interfaces 790 are incompatible with the cabling of the device.

In some embodiments, the lights 760 are a set of light emitting diodes (LEDs). The LEDs are located about the bottom of the power distribution body and illuminate under the utility hub. LEDs are preferred because of their low power consumption. A button (not shown) also about the bottom or side of the power distribution body can be used to turn the lights 760 on and off. When attached to the roof of a tent or other structure, the lights 760 illuminate the interior of the tent or structure. The lights 760 can output between 50-1000 lumens depending on the number of LEDs and brightness of each LED.

The speaker 770 outputs sound. As noted above, the speaker 770 can be coupled to the wireless receiver 730 in order to wirelessly stream and output audio from a network enabled user device. For instance, the audio can be wirelessly streamed from the user device to the wireless receiver 730 using Bluetooth and played out from the speaker 770.

The utility hub can be coupled to any tent through a small opening in a sidewall or roof of the tent. Similarly, the utility hub can be secured to the sidewall or roof of any other structure in which the opening can be created and the thickness of the sidewall or roof is less than the height of the protuberance. Preferably, the opening is aligned with the position of the solar panel that is placed over the exterior of the tent or structure. More specifically, the opening should be adjacent or below the solar panel so as to minimize the length of wiring for connecting the utility hub to the solar panel.

In some embodiments, a flap is provided to cover an opening about the tent wall or roof when the opening is not used to secure the utility hub. The flap may have Velcro, a zipper, or other means with which to close the opening and prevent air or water penetration Some embodiments provide a complete system for easy setup and access to solar panel from a tent. The complete system includes the utility hub of some embodiments, a solar panel, and a traditional or specially modified tent.

In some embodiments, the solar panel includes a set of clasps that extend from the corners or ends of the solar panel. The set of clasps couple the solar panel to exposed tent rods about the exterior of a traditional tent. Alternatively, the set of clasps can couple the solar panel to a set of anchors about the exterior of a specially modified tent.

Figure 8:
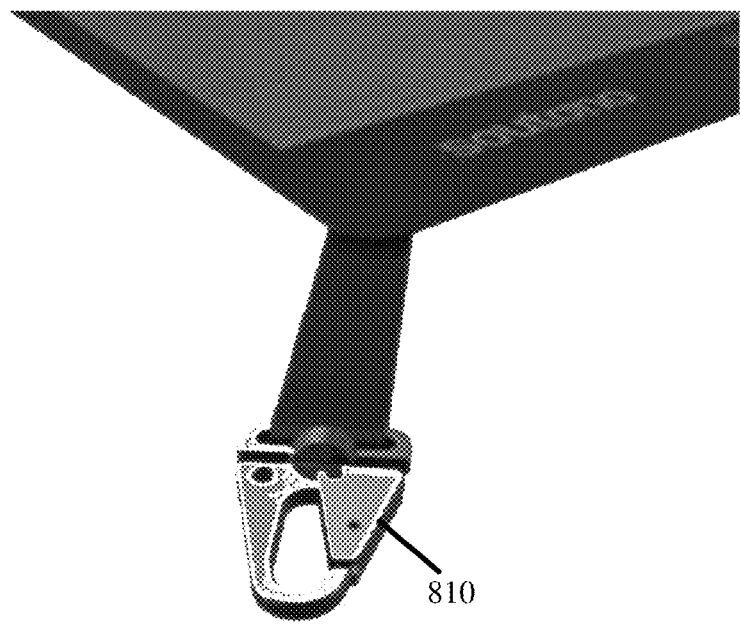
FIG. 8 provides a zoomed in view of a solar panel clasp.
Figure 9:
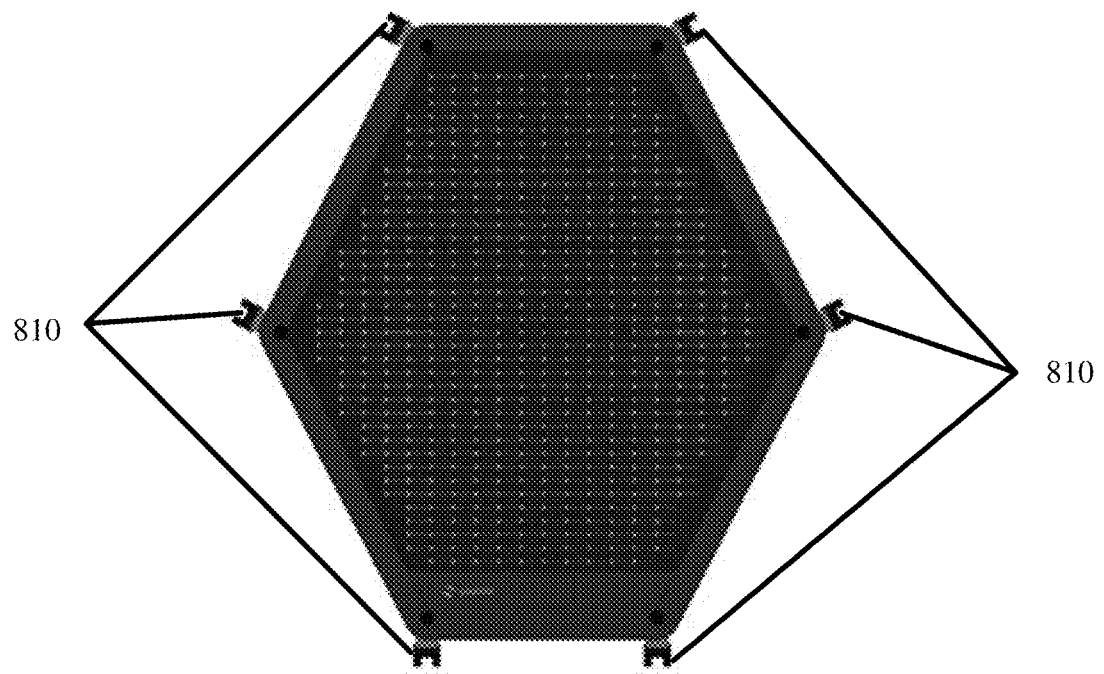
FIG. 9 illustrates a solar panel with a set of clasps extending from the corners or edges of the solar panel.

FIG. 8 provides a zoomed in view of a solar panel clasp 810. FIG. 9 illustrates a solar panel with a set of clasps 810 extending from the corners or edges of the solar panel.

Figure 10:
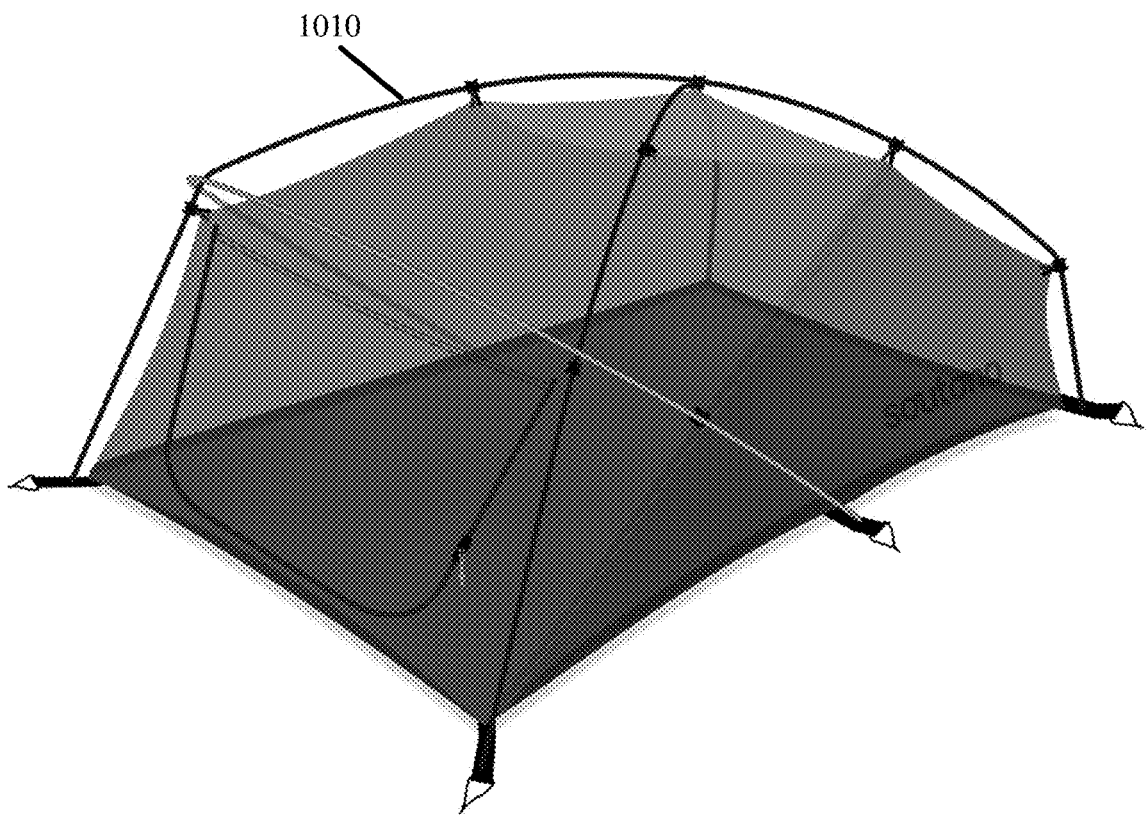
FIG. 10 illustrates exterior rods of a tent to which the clasps of the solar panel can be coupled.

FIG. 10 illustrates exterior rods 1010 of a tent to which the clasps of the solar panel can be coupled. The exterior rods 1010 include the poles supporting the tent structure. Coupling the solar panel to the exterior rods 1010 provides an ideal elevated location to protect the solar panel from damage as well as an ideal location to maximize light exposure to the solar panel. Although not shown, an opening can be provided in the tent adjacent to where the solar panel is to be mounted. The opening serves as the coupling point for the utility hub.

Figure 11:
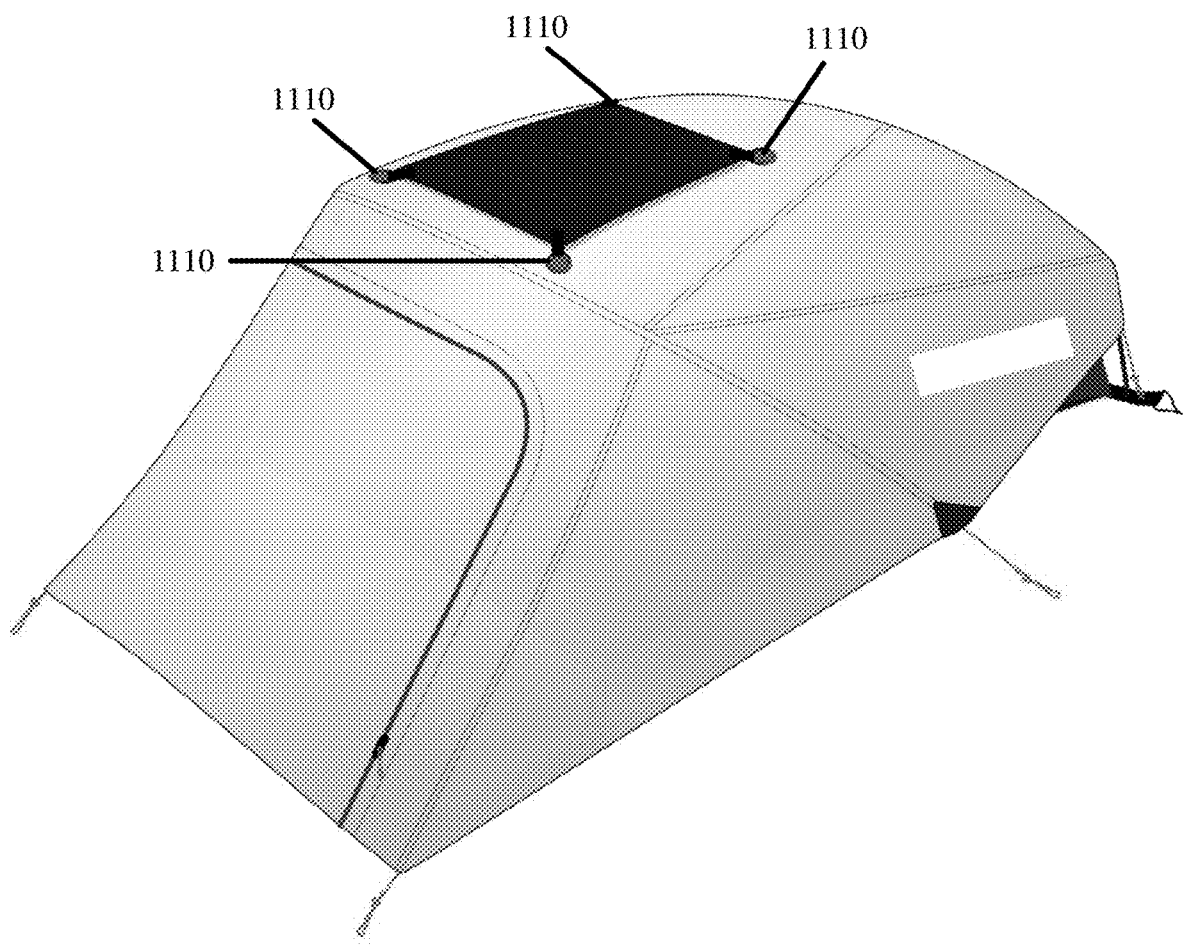
FIG. 11 illustrates the coupling of the solar panel to the specially modified tent in accordance with some embodiments.

FIG. 11 illustrates the coupling of the solar panel to the specially modified tent in accordance with some embodiments. The specially modified tent is retrofitted with a set of exterior anchors 1110. Each anchor 1110 may be a hoop or ring that is stitched into or otherwise secured to the exterior of the tent. The distance between the anchors 1110 matches the distance between the clasps of the solar panel when expanded over the tent. Each clasp is secured to a different anchor. In so doing, the solar panel becomes attached atop the exterior of the tent. Here again, an opening (not shown) for the utility hub is also provided in between the anchors or adjacent to one of the anchors.

The complete system simplifies setup and access to power when camping or otherwise away from established power infrastructure. The user erects the tent in a similar manner to erecting a traditional tent. The utility hub is separated so that the attachment ring is detached from the power distribution body. The protuberance of the power distribution body is passed through the opening about a surface of the tent from inside the tent. The attachment ring screws to the top of the protuberance jutting out from the exterior of the tent. The solar panel is secured to the tent rods, poles, or anchors using the clasps and a single connection is made between the solar panel and the exterior connection interface of the exterior exposed protuberance. Power can then be accessed from inside the tent through the interior connection interface at the base of the utility hub that remains disposed inside the tent.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A utility hub comprising:
   a power distribution body comprising a unitary structure having a circular base with a first diameter and a cylindrical segment with a proximal end that extends with a second diameter, that is less than the first diameter, directly from a top side and center of the base to a distal end that is some distance above the top side of the base,
  wherein the base comprises at least a first connection interface, the first connection interface comprising a receptacle that distributes power to a device that is connected to the first connection interface, and
  wherein the cylindrical segment comprises threading about the proximal end and at least one second connection interface positioned above the threading about the distal end of the cylindrical segment, the second connection interface transferring power from an external source to the at least first connection interface in said base; and
an attachment ring with a diameter about equal to the first diameter of the power distribution body, the attachment ring comprising a height that is less than a height of the cylindrical segment, an opening with a diameter about equal to the second diameter of the cylindrical segment, and threading within the opening, wherein the height of the attachment ring leaves the second connection interface positioned above the distal end of the cylindrical segment exposed when the attachment ring is secured flush against circular base as a result of screwing onto the threading about the proximal end of the cylindrical segment.

2. The utility hub of claim 1, wherein the first connection interface and the second connection interface are Universal Serial Bus (USB) ports.

3. The utility hub of claim 1, wherein the at least one first connection interface comprises a first USB-C port and a different second charging port.

4. The utility hub of claim 1 further comprising circuitry and wiring connecting the first connection interface to the at least one second connection interface.

5. The utility hub of claim 1 further comprising a battery storing power input through the second connection interface and outputting said power through the at least one first connection interface in response to a device connecting to the at least one first connection interface.

6. The utility hub of claim 5 further comprising a plurality of light emitting diodes (LEDs) exposed through a bottom of said base and distributed circularly about said base, said LED providing illumination based on said power from the battery.

7. A charging apparatus comprising:
a body comprising a cylindrical column of a first diameter that extends directly from a center of a base of a greater second diameter,
  the cylindrical column comprising a power input port with a female interface about a side of the cylindrical column and exterior threading below said power input port, wherein the female interface comprises a receptacle for receiving an extruding male interface of a device or wire, and
  the base comprising at least one power output port about a bottom of the base, wherein the power input port feeds electric current to the at least one power output port; and
an attachment ring comprising a height about equal to a height of the exterior threading of the cylindrical column, a central opening about equal to the first diameter, interior threading around said central opening, and a diameter about equal to the second diameter,
  wherein the attachment ring connects flush against the base with the central opening passing through and past the power input port of the cylindrical column and with the interior threading of the attachment ring screwing onto the exterior threading of the cylindrical column such that the height of the attachment ring leaves the power input port exposed about the side of the cylindrical column, and
  wherein the charging apparatus mounts to an elevated surface by disposing the elevated surface between said base and said attachment ring, and by screwing said attachment to the exterior threading of the cylindrical column.

8. The charging apparatus of claim 7 further comprising a first wired connection between the power input port and a power source, and a second wired connection between the at least one power output port and a device with a depleted battery.

9. The charging apparatus of claim 8, wherein the power input port receives said electric current from the power source and transfers said electric current to the device through the at least one power output port.

10. The charging apparatus of claim 7, wherein the at least one power output port comprises first and second charging ports of the same interface.

11. The charging apparatus of claim 7, wherein the at least one power output port comprises first and second charging ports of different interfaces.

12. The charging apparatus of claim 7, wherein the body further comprises an integrated battery charging based on said electric current from the power input port.

13. The charging apparatus of claim 7, wherein the body further comprises a wireless receiver and a speaker outputting audio wirelessly received by the wireless receiver.

14. The charging apparatus of claim 7, wherein the body further comprises power control circuitry, said power control circuitry increasing or decreasing said electric current flowing to the at least one power output port in response to detecting a device that is connected to the at least one power output port.

15. A charging system comprising:
a tent comprising a surface opening and a plurality of connecting points about an exterior of said tent;
a solar panel comprising a plurality of solar cells, a plurality of clasps, and a wire, said plurality of clasps securing the solar panel over an exterior of said tent by coupling to the plurality of connecting points about the exterior of said tent; and
a charging hub comprising:
  a body comprising a base with a first diameter, at least one power output port about an exterior side of the base, and a protruding segment directly extending upwards from a center of said base with a second diameter, that is less than the first diameter, through said surface opening with a power input port at a top of the protruding segment and threading below the power input port, wherein the power input port connects to said wire of the solar panel and distributes electric current from the solar panel to the at least one power output port; and
  an attachment ring attaching the charging hub to said tent by passing through the top of the protruding segment below the power input port, and by coupling to the threading with the attachment ring pressing on the tent from one side and said base pressing on the tent from an opposite side, and the power input port being exposed above the attachment ring and connected to said wire of the solar panel.

16. The charging system of claim 15, wherein the plurality of connection points are rods used in erecting said tent.

17. The charging system of claim 15, wherein the plurality of connecting points are a plurality of rings attached along an exterior of said tent.

18. The utility hub of claim 1, wherein the first connection interface and the second connection interface are female interfaces comprising a receptacle for receiving a male interface of a separate device or wire.

\* \* \* \* \*